(12) United States Patent
Sandberg et al.

(10) Patent No.: US 11,593,750 B2
(45) Date of Patent: Feb. 28, 2023

(54) MANAGING AND TRACKING SHIPMENTS

(71) Applicant: KlearExpress Corporation, San Jose, CA (US)

(72) Inventors: Ulf Sandberg, San Jose, CA (US); Sanjeev Tyagi, San Jose, CA (US); Ricardo Tellez, San Jose, CA (US)

(73) Assignee: KlearNow Corporation, Santa Clara, CA (US)

( * ) Notice: Subject to any disclaimer, the term of this patent is extended or adjusted under 35 U.S.C. 154(b) by 0 days.

(21) Appl. No.: 16/723,035

(22) Filed: Dec. 20, 2019

(65) Prior Publication Data
US 2020/0202296 A1 Jun. 25, 2020

Related U.S. Application Data

(60) Provisional application No. 62/782,940, filed on Dec. 20, 2018.

(51) Int. Cl.
*G06Q 10/08* (2012.01)
*G06Q 10/0834* (2023.01)
*G06Q 10/0833* (2023.01)

(52) U.S. Cl.
CPC ..... *G06Q 10/0834* (2013.01); *G06Q 10/0833* (2013.01)

(58) Field of Classification Search
CPC . G06Q 10/08; G06Q 10/0833; G06Q 10/0834
See application file for complete search history.

(56) References Cited

U.S. PATENT DOCUMENTS

| 8,429,019 | B1 | 4/2013 | Yeatts et al. |
| 10,867,276 | B1 * | 12/2020 | Lopez ................ G06Q 30/0635 |
| 2005/0119786 | A1 | 6/2005 | Kadaba |
| 2014/0095350 | A1 | 4/2014 | Carr et al. |
| 2016/0379168 | A1 | 12/2016 | Foerster et al. |
| 2017/0046658 | A1 * | 2/2017 | Jones ...................... H04W 4/02 |

(Continued)

FOREIGN PATENT DOCUMENTS

WO   WO-2004104941 A2 * 12/2004  ....... G06Q 10/08355

OTHER PUBLICATIONS

S. Robak, B. Franczyk and M. Robak, "Applying big data and linked data concepts in supply chains management," 2013 Federated Conference on Computer Science and Information Systems, 2013, pp. 1215-1221. (Year: 2013).*

*Primary Examiner* — Scott M Tungate
(74) *Attorney, Agent, or Firm* — Stevens Law Group; David R. Stevens

(57) ABSTRACT

The present invention extends to methods, systems, and computer program products for managing and tracking shipments. Aspects of the invention provide an automated tracking and management system that allows interested parties (e.g., customers, truckers, carriers, consignees, manufacturers, importers, exporters, freight forwarders, etc.) to manage and track shipments across various different and diverse transportation legs between an origin and a destination. The tracking and management system (or "the system") facilitates more efficient shipment logistics for interested parties in a number of ways. The system can provide truckers with information about a container (e.g., empty or full) or pallet or other shipment that is to be picked up at a location for further transportation.

12 Claims, 6 Drawing Sheets

(56) References Cited

U.S. PATENT DOCUMENTS

| | | | |
|---|---|---|---|
| 2017/0300851 A1* | 10/2017 | Bielefeldt | G06Q 30/02 |
| 2017/0323249 A1 | 11/2017 | Khasis | |
| 2018/0046964 A1* | 2/2018 | Leoni | G06Q 10/06315 |
| 2018/0253688 A1 | 9/2018 | Schenken et al. | |
| 2018/0268348 A1* | 9/2018 | Guan | G06Q 10/083 |
| 2019/0034127 A1* | 1/2019 | Chhabra | G06F 3/121 |

* cited by examiner

MANAGING AND TRACKING SHIPMENTS

CROSS-REFERENCE TO RELATED APPLICATIONS

This application claims the benefit of U.S. Provisional Application Ser. No. 62/782,940 entitled, "Shipping Logistics System," filed Dec. 20, 2018, which is hereby incorporated herein by reference in its entirety.

BACKGROUND

1. Field of the Invention

This invention relates generally to the field of international and domestic shipping, and, more particularly, to managing and tracking shipments

2. Related Art

Shipping goods around the globe and even within a country is a complicated logistics process. A global or country level shipment can have many transportation legs from an origin to to a destination. Logistics of tracking shipments across different transportation legs can be difficult to manage.

BRIEF DESCRIPTION OF THE DRAWINGS

The specific features, aspects and advantages of the present invention will become better understood with regard to the following description and accompanying drawings where.

DETAILED DESCRIPTION

Figure 1:
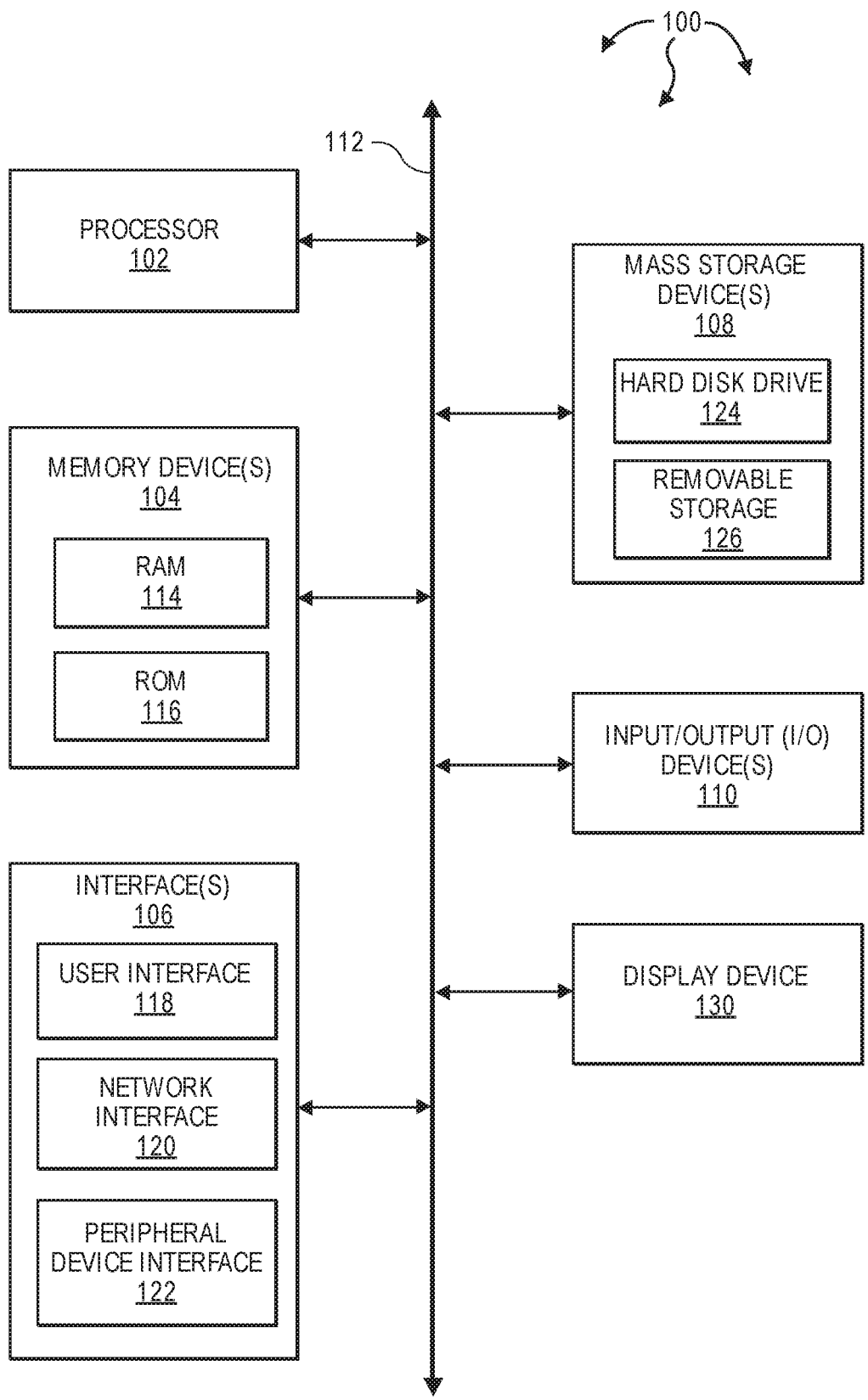
FIG. 1 illustrates an example block diagram of a computing device.

The present invention extends to methods, systems, and computer program products for managing and tracking shipments. Aspects of the invention provide an automated tracking and management system that allows interested parties (e.g., customers, truckers, carriers, consignees, manufacturers, importers, exporters, freight forwarders, etc.) to manage and track shipments across various different and diverse transportation legs between an origin and a destination.

The tracking and management system (or "the system") facilitates more efficient shipment logistics for interested parties in a number of ways. The system can provide truckers with information about a container (e.g., empty or full) or pallet or other shipment that is to be picked up at a location for further transportation.

The system can assist truckers with identifying a shipment. For example, a trucker can use a mobile device camera to capture an image of a container identifier. The system can convert the image to text using Optical Character Recognition (OCR). The system can prompt the trucker for any missing or incorrect characters as well as indicate if the container is in a shipment being managed by the system. A trucker may also use a mobile device camera to scan a barcode and/or QR code of one or more pallets. The system can convert the scan to text using Optical Character Recognition (OCR). The system can prompt the trucker to for any missing or incorrect characters as well as indicate if the one or more pallets is in a shipment being managed by the system.

The system can provide a trucker with voice driving instructions from a starting location to the destination location through an associated Trucker application. Driving instructions can correspond to the movement of an empty container, pallet with goods, a shipment container that contains goods or any other type of shipment. Movement can be in-bound to a destination (e.g., pallet or shipment container delivery to an Importer from a port) as well as outbound to a destination (e.g., a customer receiving pallets of manufactured goods from a manufacturer).

The system can assign a trucker one or more additional stops as appropriate before and/or during the delivery and/or pickup.

The system can provide a customer with real-time or near real-time whereabouts of a trucker and shipments (e.g., empty containers, containers with goods, pallets, other, etc.). There may be many simultaneous shipments, shipment containers, pallets, other shipments, etc. that a customer is managing at any time.

The system can assist customers and truckers with scheduling shipment movements through (e.g., a graphical) user interface. Scheduled shipment movements can include delivery movement(s) and pick up movement(s) at port yard, train terminal, airports, trucking company storage yard, and any other locations, for both empty and loaded shipment containers and pallets with goods and any other type of shipment. If the pickup/delivery destination (i.e. port yard, train terminal etc.) has an electronic interface, the system leverages the electronic interface to manage the calendaring schedule electronically.

Scheduling shipment movements can include utilizing the user interface to change a delivery or pickup location address on the fly at any time. Utilizing the user interface to change a location bypasses other more cumbersome location change mechanisms including contacting trucker dispatchers via phone, SMS, email and other means.

The system can allow a customer to assign a trucker score to a trucker for any pickup and/or delivery movements. The system can present assigned trucker scores to the truckers.

The system can assist constituents with security and chain of custody.

In general, different shipping systems can maintain and provide information related to different transportation legs of a shipment. Some shipping systems can be electronic while others are paper based. Further, electronic shipping systems associated with different transportation legs are often siloed from and not connected to one another. Using siloed and/or paper shipping systems can limit end to end visibility and insight into shipment state. For example, companies engaged in the movement of the goods may be unable to communicate with one another.

Further, a variety of entities, such as, government entities, shippers, carriers, brokers, customers, truckers, etc., participate in both domestics and international shipping and each can play some part in transportation of a shipped item. Each party participating in shipping may separately administer a computer and/or network system. As such, a plurality of separately administered computer and network systems can interoperate with one another, at least to some extent, to facilitate transportation of a shipped item. That is, each individual party participating in a shipping transaction may utilize their own computer and network systems and may interact with the computer and network systems of multiple other parties (N to N communication paths). Accordingly, when considered in the aggregate, the plurality of separately administered computer and network systems comprise the "shipping system".

Various computer and network resource inefficiencies are present in the international shipping system. For example, shipping/delivery related activities performed by one party (e.g., manual processes) may not be quickly discernible by another dependent party. Additionally, performance of shipping/delivery related activities by different parties can redundantly generate and/or transport data to and from different computer and network systems. Separately administered computer and network systems can also use different data formats, different data interfaces, and different protocols. Use of different data formats, interfaces, and protocols at different separately administered computer and network systems increases data processing resource requirements across the international shipping system.

Accordingly, aspects of the invention utilize a unifying system and unifying database to consolidate shipping/delivery related information (e.g., generated by and relevant to different parties participating in the shipping system) in a common (centralized) location. The unifying system and unifying database essentially operate as a centralized shipping information hub. Parties can interact with the unified system to update relevant information corresponding to their shipping/delivery related activities within the unified database. Using a unified system and unified database relieves each separately administered computer and network system from performing communication and data conversions for multiple other separately administered computer and network systems. Thus, data processing requirements at separately administered computer and network system are reduced. In turn, overall data processing requirements across the shipping system are also reduced permitting the shipping system to operate more efficiently and effectively. It provides end-to-end visibility to where the shipment is at any given time (in real-time or near real-time), regardless of the specific shipping mode at that time (sea, air, land) which is very hard, if not impossible to obtain, due to the siloed systems today.

When one party generates or updates information, other parties can be automatically notified electronically in essentially real time of status changes relevant to a shipment. Accordingly, information from, a shipper, a carrier, a broker, a customer, a trucker, etc., are better integrated in a platform where parties cooperatively communicate to track and manage shipments.

Information stored in the unifying database can be maintained in an anonymous format obscuring any personal information. Information associated with transportation transactions can be leveraged for reflective, prospective, projective, descriptive, predictive, prescriptive and other analytics, patterns and strategic decisions including providing analytic information and data sets back to customers, carriers, truckers, governmental entities, or other companies.

In this description and the following claims, a "carrier" is defined as a person or company that transports goods or people for any person or company and that is responsible for any possible loss of the goods during transport. Transport includes by air, sea, land, or space.

In this description and the following claims, a "consignee" is the party indicated on a bill of lading or an air waybill to whom the shipment is consigned or who is to be actually receiving the shipment.

In this description and the following claims, a "container" is defined as an intermodal container, for example, a larger standardized shipping container, designed and built for intermodal freight transport. That is, a container usable across different modes of transport, for example, from ship to rail to truck, without unloading and reloading contained cargo. Intermodal containers can be used to store and transport materials and products efficiently and securely in the global containerized intermodal freight transport system as well as regionally.

Intermodal containers may be referred to as containers, Twenty-Foot Equivalent Units (TEU), cargo container, freight container, ISO container, shipping container, sea or ocean container, container van, container box, sea can, can, etc. There are many types and a number of standardized sizes of intermodal containers. A majority of worlds global container fleet are referred to as "dry freight" or "general purpose" containers, which are durable closed steel boxes, primarily of either twenty or forty feet (6.1 or 12.2 m) standard length. Heights are primarily 8 feet 6 inches (2.6 m) and 9 feet 6 inches (2.9 m). A 9 feet 6 inch cube may be referred to as a "High Cube" or "Hi-Cube container".

In this description and the following claims, a "container id" is defined as a unique, for example, 11 position, alphanumeric code, such as, "BICU1234565". Each container in a transportation/shipping system can be assigned a container id. An assigned container id can be written on a corresponding container. As such, each container in a transportation/shipping system can be uniquely identified, In this description and the following claims, a "chassis" is an asset that truckers use to transport containers on land. A chassis can be associated with a unique identifier similar to a container.

In this description and the following claims, "constituents" is defined as any application persona, including manufacturer, exporter, importer, trucker, customer, etc.

In this description and the following claims, a "customer" or "importer" is defined as company or other entity that imports goods from any country into a different country (e.g., from China to United States) an importer.

In this description and the following claims, an "exporter" is defined as a company or other entity that exports goods from a country into another country (e.g., from China to United States).

In this description and the following claims, a "customs bond provider" is defined as an entity In this description and the following claims, "FCL" is defined as full container load.

In this description and the following claims, "LCL" is defined as less than a container load. If a shipper has LCL, the shipper can share space and transportation costs with others.

In this description and the following claims, a "freight forwarder", a "forwarder", a "forwarding agent", or a "non-vessel operating common carrier" ("NVOCC") is defines as an entity (e.g., person or company) that organizes shipments for other entities to get goods from a manufacturer or producer to a market, customer, or other final point of distribution. An organizing entity contracts with a carrier or often multiple carriers to transport goods. Carriers can, and often do, use a variety of shipping modes, including ships, airplanes, space craft, trucks, and railroads. For example, it can be arranged to have cargo moved from a plant to an originating airport by truck, flown from the originating airport to a destination airport, and then moved from the destination airport to a customer's building by another truck.

In this description and the following claims, "positioning system/location services" is defined as any system or service that uses information from cellular, Wi-Fi, positioning system networks, Bluetooth, etc., to approximate a location of an item. An example of a positioning system/location service is the Global Positioning System (GPS), satellite-based radio navigation system. A trucker application can use GPS.

In this description and the following claims, a "mile" is defined as a metaphor for a transportation leg of an overall shipment (and not the actual distance covered). A mile can be in the beginning of a shipment (e.g., a first mile), anywhere in the middle of the shipment (a transportation mile), or at the end of the shipment (e.g., a last mile). Segment, portion, part, leg, or stage may also refer to a sub-component of an overall shipment.

In this description and the following claims, a "pallet" is defined as a flat transport structure, which supports goods in a stable fashion while being transported. One or more pallets can be placed in (or "stuffed" into) a shipping container, broken up into a number of individual or grouped deliveries by a trucker, etc.

In this description and the following claims, a "pallet id" is defined as a barcode, a QR code, or other code that uniquely identifies a pallet, for example, in an airwaybill. In this description and the following claims, a "shipment" is defined as commercial transportation of an item from an origin to a destination. A shipment can include any number of shipping modes, including ocean (containers and pallets inside containers), air (pallets), train (containers and pallets), truck (containers and pallets), space, etc. within a stage. A shipment can include one or more containers (e.g., full or partial containers containing one or more pallets) and one or more pallets. Shipments can include essentially any type of item, such as, for example, fashion, food, furniture, computers, electronics, semiconductors, biotechnology, pharmaceuticals, etc.

In this description and the following claims, a "trucker" is defined as an entity that transports a shipment between locations. Locations can include container storage yards, air ports, train station, shipping port, space port, importers warehouse, wholesaler, manufacturing plant, etc. A trucker can also pick up a chassis that a shipping container is loaded on for transportation. That is, the container may be previously been loaded onto the chassis and the trucker uses the chassis to transport the container.

In this description and the following claims, a "trucker score" is defined as an individual satisfaction score corresponding to a trucker. A trucker score can be calculated using a score calculation algorithm and/or satisfaction scores received from customers. In one aspect, a trucker score is a combination of a score calculation algorithm calculation and one or more satisfaction scores. A trucker score can be represented on a scale, for example, from 1 (low) to 5 (high).

Aspects of the invention can be utilized during essentially any mile, segment, portion, stage etc., of a shipment.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
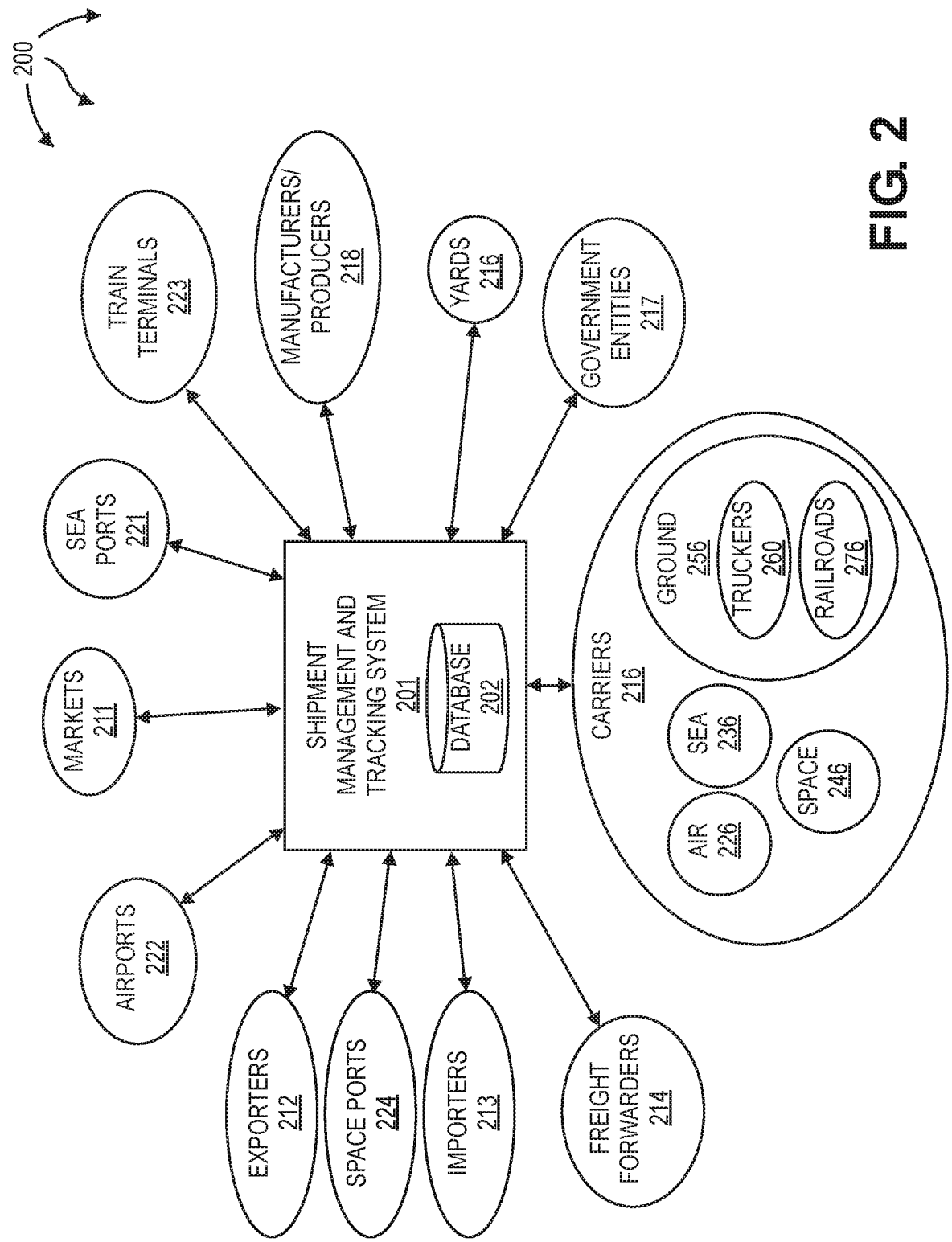
FIG. 2 illustrates an example computer architecture that facilitates managing and tracking shipments.

FIG. 2 illustrates an example computer architecture that facilitates managing and tracking shipments.

As depicted, computer architecture 200 includes shipment management and tracking system 201, exporters 212, space ports 224, importers 213, freight forwarders 214, carriers 216, government entities 217 (e.g., customs agencies), yards 219, manufactures/producers 218, train terminals 223, sea ports 221, markets 211, and airports 222. Each of shipment management and tracking system 201, exporters 212, space ports 224, importers 213, freight forwarders 214, carriers 216, government entities 217 (e.g., customs agencies), yards 219, manufactures/producers 218, train terminals 223, sea ports 221, markets 211, and airports 222 can be connected to (or be part of) a network, such as, for example, a system bus, a Local Area Network ("LAN"), a Wide Area Network ("WAN"), and even the Internet. Accordingly, shipment management and tracking system 201, exporters 212, space ports 224, importers 213, freight forwarders 214, carriers 216, government entities 217 (e.g., customs agencies), yards 219, manufactures/producers 218, train terminals 223, sea ports 221, markets 211, and airports 222 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Thus, shipment management and tracking system 201 can be connected to computing resources and/or networks of a plurality of entities of a plurality of different entity types. At least some entities and/or entity types may communicate electronically using different data protocols, different data formats, different data types, different Electronic Data Interchange (EDI), etc. Shipment management and tracking system 201 can include tailored combinations of connectors, converters, formatters, etc. that facilitate compatible electronic communication with entities and entity types using different data protocols, different data formats, different data types, different Electronic Data Interchange (EDI), etc. Accordingly, shipment management and tracking system 201 can be configured for compatible electronic communication with entities included in any of exporters 212, space ports 224, importers 213, freight forwarders 214, carriers 216, government entities 217, yards 219, manufactures/producers 218, train terminals 223, sea ports 221, markets 211, and airports 222

In one aspect, shipment management and tracking system 201 includes a combination (e.g., a stack) of one or more components (e.g., connectors, converters, formatters, etc.) per entity or subset of entities. A combination of one or more components (e.g., the same stack) can be shared by entities that use similar (or the same) data protocols, data formats, data types, Electronic Data Interchange (EDI), etc. When electronic data is received at shipment management and tracking system 201 from an entity, a tailored combination of one or more components (e.g., a stack) can convert the electronic data from an entity data format into a uniform data format.

Data in the uniform data format can be stored in database 202. Thus, electronic data from different entities can stored together in database 202. Shipment management and tracking system 201 can include internal modules that perform various shipment management and shipment tracking activities. The internal modules can be configured to utilize data in the uniform data format. As such, shipment management and tracking system 201 can more efficiently and effectively make decisions with respect to shipment management activities and shipment tracking activities based on combinations of data from different entities.

When electronic data is sent from shipment management and tracking system 201 to an entity, a combination of one or more components (e.g., a stack) can convert the electronic data from the uniform data format into the appropriate entity format.

Elements depicted in computer architecture 200 can represent a plurality of an entity type. For example, importers 213 may include a plurality of different importers, freight forwarders 214 may include a plurality of freight forwarders, train terminals 223 may include a plurality of train terminals, etc. Each instance of an entity type may use one or more computer systems and/or may include its own computer network.

Thus, various components depicted in computer architecture 200 may also represent entire networks. For example, a manufacturer 216 can represent a computer network of an E-commerce website. A carrier 216 can represent a computer network of a carrier that transports items internationally via any of land, sea, and air. A government entity 217 can represent a computer network of a governmental agency that handles imports (and possibly exports) for country 203.

Manufactures/producers 218 can create items that are shipped in a shipment. Markets 211 can consume items shipped in a shipment.

Yards 219 include areas where containers and/or chassis can be temporarily held between transportation modes. For example, sea port can have a yard where containers are stored after unloading form a ship and prior to pick up by truckers.

Space ports 224 include ground-based launch facilities where craft are launched into space.

Carriers 216 can include air carriers 226, sea carriers 236, ground carriers 256, and space carriers 246. Ground carriers 256 can include truckers 266 and railroads 276. A carrier company may include one or more of air transportation resources (e.g., planes, helicopters, etc.), sea transportation resources (e.g., ships, etc.), ground transportation resources (truckers, railroads, etc.), space transportation resources (e.g., rockets, etc.), etc. Some carrier companies may specialize in one type (or mode) of transportation resource, for example, truckers. Other companies can include transportation resources that span modes (e.g., air and sea) or that span transportation types within a mode (e.g., truckers and railroads).

In general, shipment management and tracking system 201 can receive transportation requests for transportation resources from other entities, assign transportation resources to fulfill a transportation request, and update appropriate entities about transportation request progress.

Figure 3:
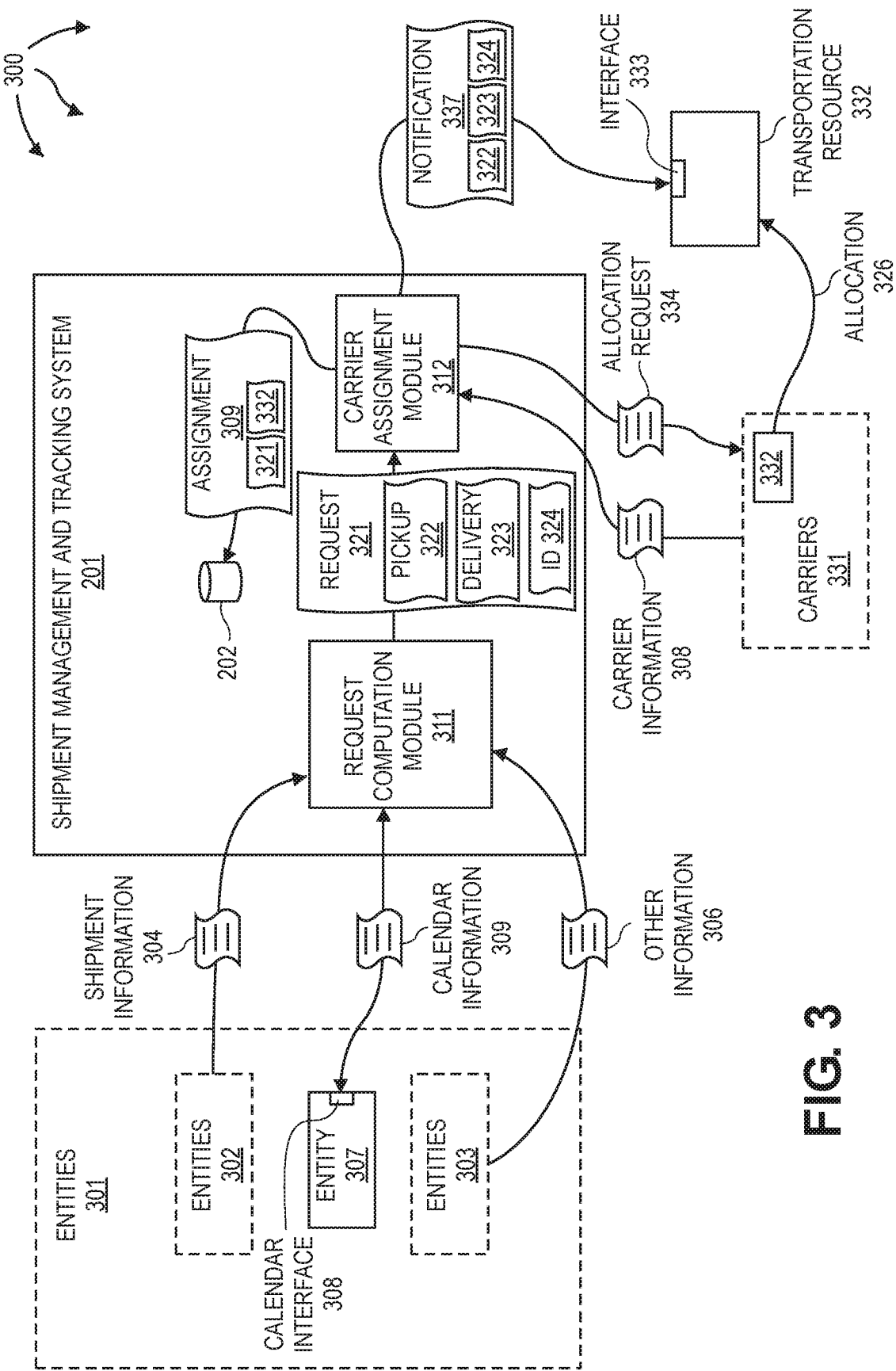
FIG. 3 illustrates an example computer architecture that facilitates allocating a transportation resource to satisfy a transportation request.

FIG. 3 illustrates an example computer architecture 300 that facilitates allocating a transportation resource to a transportation request. As depicted, computer architecture 300 includes shipment management and tracking system 201, entities 301, and carriers 331. Entities 301 can include any of exporters 212, space ports 224, importers 213, freight forwarders 214, carriers 216, government entities 217, yards 219, manufactures/producers 218, train terminals 223, sea ports 221, markets 211, and airports 222. Carriers 331 can include any of carriers 216.

Entities 301 include entities 302, entities 303, and entity 307. Entities 302 and entities 303 can bet subsets of entities included in entities 301. For example, entities 302 can include one or more of: a manufacture, a producer, an importer, an exporter, a freight forwarder, a market, or a government entity. Entities 303 can include one or more of: an airport, a seaport, a train terminal, or a yard. Entity 307 may be an entity included in entities 302 or 303 or may a different entity included in entities 301.

As depicted, shipment management and tracking system 201 includes database 202, request computation module 311, and carrier assignment module 312. Computation module 311 can receive information from entities and interoperate with entity calendar interfaces to compute transportation requests for transportation services. Carrier assignment module 312 can receive information from carriers and assign and allocate a transpiration resource to fulfill a transportation request. Carrier assignment module 312 can also notify an allocated transportation resource about the details of a transportation request.

Figure 4:
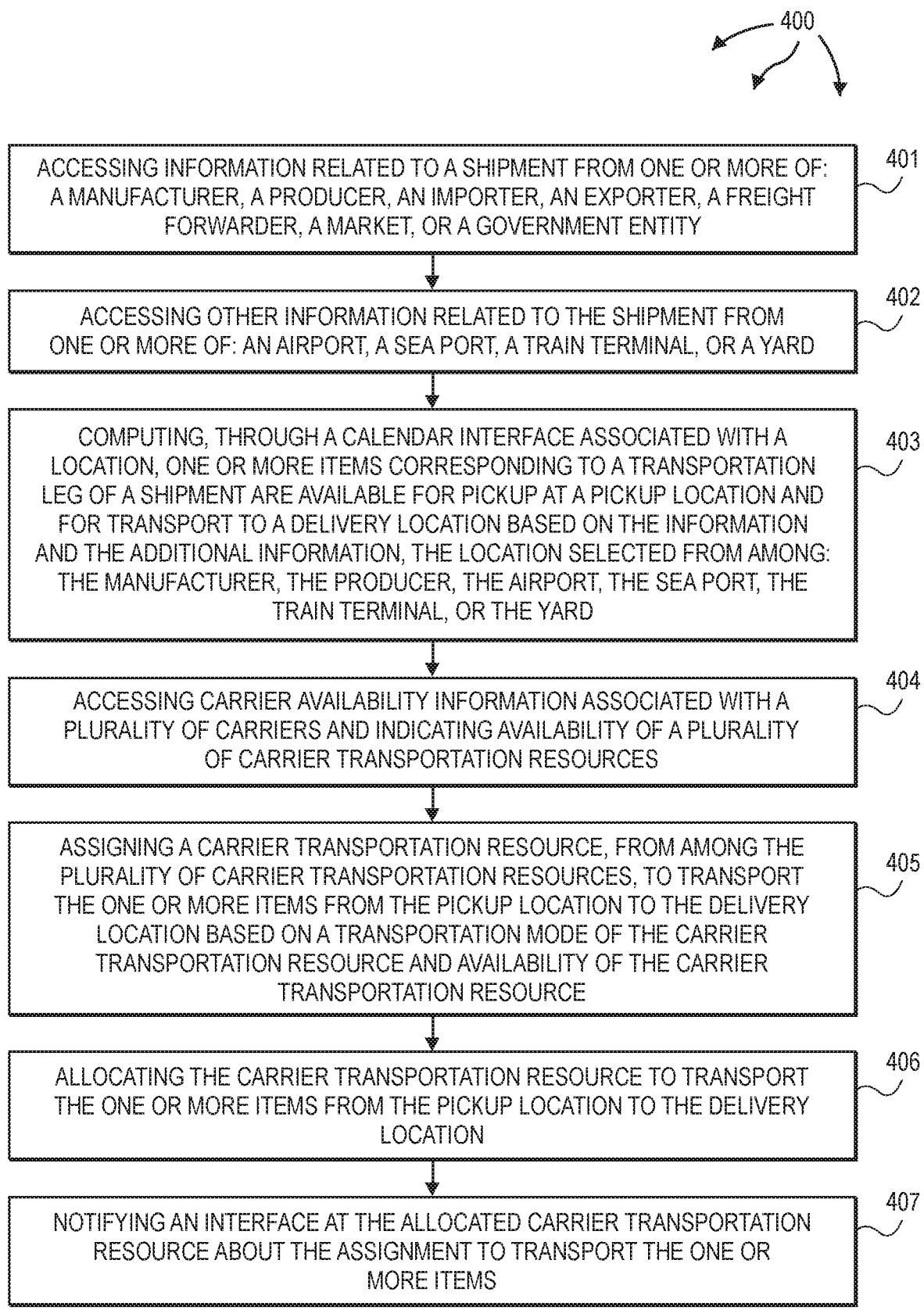
FIG. 4 illustrates a flow chart of an example method for allocating a transportation resource to satisfy a transportation request.

FIG. 4 illustrates a flow chart of an example method 400 for allocating a transportation resource to satisfy a transportation request. Method 400 will be described with respect to the components and data depicted in computer architecture 300.

Method 400 includes accessing information related to a shipment from one or more of: a manufacturer, a producer, an importer, an exporter, a freight forwarder, a market, or a government entity (401). For example, request computation module 311 can receive shipment information 304 from entities 302. Shipment information 304 can be a shipping plan, an indication of one or more shipping stages, an express request for transportation resources for a shipping stage, etc. Shipping information can include container and/or pallet IDs, facilities where containers and/or pallets are located, transportation modes, etc. One or more connectors, converters, formatters, etc. can be used to convert shipment information 304 into the uniform data format.

Method 400 includes accessing other information related to the shipment from one or more of: an airport, a sea port, a train terminal, or a yard (402). For example, request computation module 311 can receive other information 306 from entities 303. Other information 306 can include location of containers and/or pallets (e.g., by ID) within a facility, dates and/or times containers and pallets can be accessed at a facility, instructions for accessing containers and pallets at a facility, etc. One or more connectors, converters, formatters, etc. can be used to convert other information 306 into the uniform data format.

Method 400 includes computing, through a calendar interface associated with a location, one or more items corresponding to a transportation leg of a shipment are available for pickup at a pickup location and for transport to a delivery location based on the information and the additional information, the location selected from among: the manufacturer, the producer, the airport, the sea port, the train terminal, or the yard (403). For example, request computation module 311 can compute request 321 including pickup 322, delivery 323, and (e.g., container and/or pallet) ID(s) 324 based shipment information 304 and other information 306. Pickup 322 can be at entity 307. Request 321 may also include a pickup timeslot. Request computation module 311 can compute request 321 by exchanging calendar information 309 with entity 307 through calendar interface 308. Request 321 can be a request to transport one or more containers and/or one or more pallets associated with a transportation leg, including picking up the one or more containers and/or the one or more pallets at entity 307 (pickup location 322) and delivering the one or more containers and/or the one or more pallets to delivery location 323.

In one aspect, entity 307 is a manufacturer, a producer, an airport, a sea port, a train terminal, or a yard. The delivery location can be an airport, a sea port, a train terminal, a yard, or a market.

Request computation module 311 can send request 321 to carrier assignment module 312. Carrier assignment module 312 can receive request 321 from request computation module 311.

Method 400 includes accessing carrier availability information associated with a plurality of carriers and indicating availability of a plurality of carrier transportation resources (404). For example, carrier assignment module 312 can access carrier information 308 from carriers 331. Carrier information 308 can indicate the availability of transportation resources at carriers 331. One or more connectors, converters, formatters, etc. can be used to convert carrier information 308 into the uniform data format.

Method 400 includes assigning a carrier transportation resource, from among the plurality of carrier transportation resources, to transport the one or more items from the pickup location to the delivery location based on a transportation mode of the carrier transportation resource and availability of the carrier transportation resource (405). For example, carrier assignment module 312 can assign transportation resource 332 (e.g., a trucker) to satisfy request 321 by transporting the one or more containers and/or one or more pallets from entity 307 (pickup location 322) to delivery location 323. Carrier assignment module 312 can assign transportation resource 332 based on the transportation mode transportation resource 332 (e.g., ground) and the availability of transportation resource 332 (e.g., time, location, etc.)

Carrier assignment module 312 can store assignment 309 in database 202. Assignment 309 indicates that transportation resource 332 is assigned to request 321. Shipping management and transportation system 201 can update entity 307 with information from assignment 309.

Method 400 includes allocating the carrier transportation resource to transport the one or more items from the pickup location to the delivery location (406). For example, carrier assignment module 312 can send allocation request 334 to carriers 331. One or more connectors, converters, formatters, etc. can be used to convert allocation request 334 into a format compatible with carriers 331. In response to allocation request 334, carriers 331 can allocate 326 transportation resource 332 to satisfy request 321.

In response to allocation of transportation resource 332, carriers 331 can send a confirmation message back to carrier assignment module 312. Carrier assignment module 312 can indicate the confirmation in assignment 309. Shipping management and transportation system 201 can update entity 307 with confirmation that transportation resource 332 has been allocated to request 321.

Method 400 includes notifying an interface at the allocated carrier transportation resource about the assignment to transport the one or more items (407). For example, carrier assignment module 312 can send notification 337 to interface 333 at transportation resource 332. Notification 337 can also include the pickup timeslot. One or more connectors, converters, formatters, etc. can be used to convert notification 337 into a format compatible with interface 332. Notification 337 includes pickup location 322 (entity 307), delivery location 323, and (e.g., container and or pallet) ID(s) 324. Pickup location 322 (entity 307), delivery location 323, and ID(s) 324 can be presented on a screen at transportation resource. A navigation system can provide directions to from a current location to pickup location 322

(entity 307) and can provide directions from pickup location 322 (entity 307) to delivery location 323.

Through interface 333, transportation resource 332 can update shipment management and tracking system 201 with respect to progress in completing request 321. One or more connectors, converters, formatters, etc. can be used to convert updates into the uniform data format. Updates can be stored at database 202. From time to time or upon request, shipment management and tracking system 201 can access updates from database 202 and send the updates to entity 307 (and/or other interested entities). One or more connectors, converters, formatters, etc. can be used to convert updates into a format compatible with entity 307 (and/or other interested entities).

Figure 5:
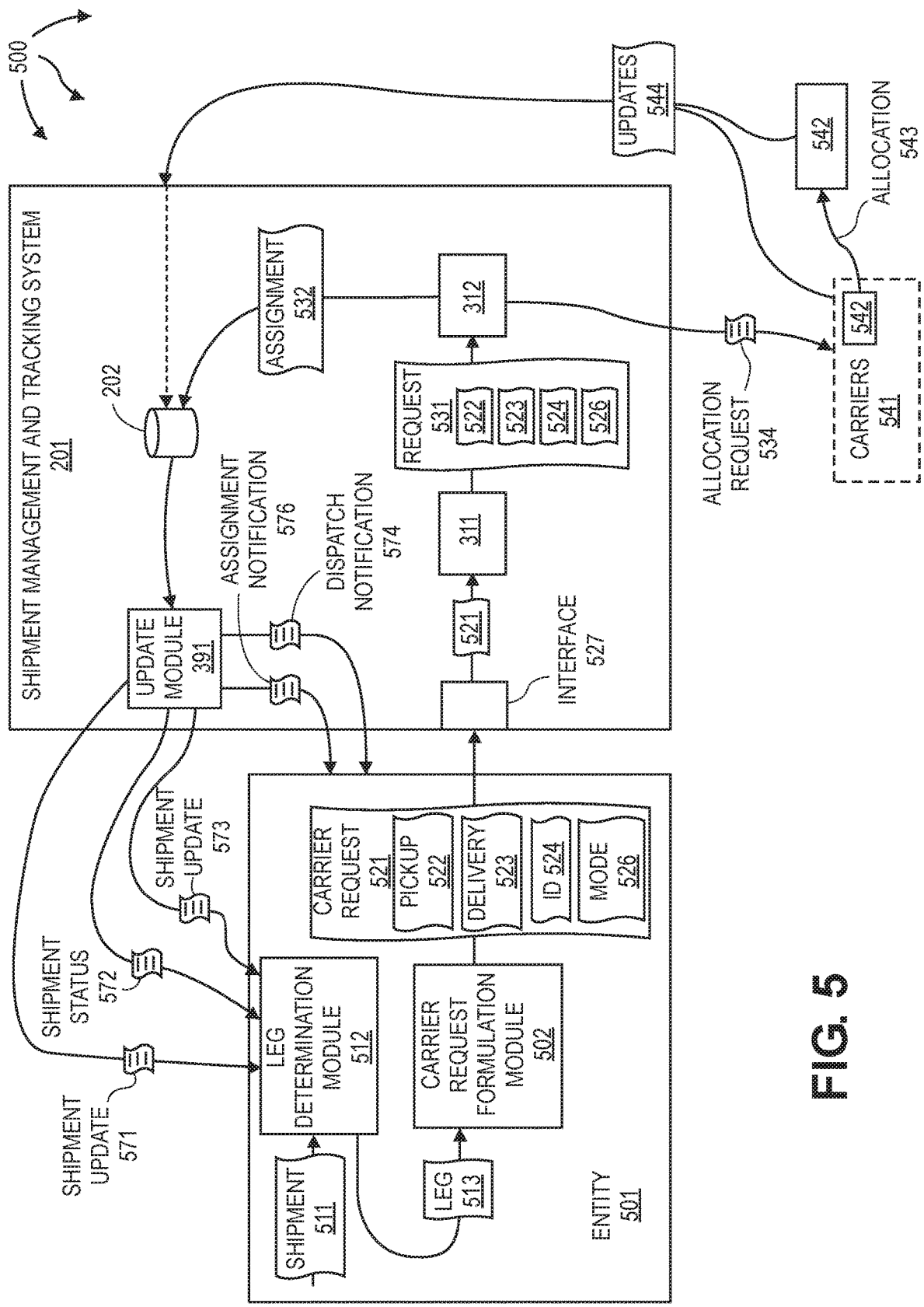
FIG. 5 illustrates an example computer architecture that facilitates requesting a transportation resource and being updated about transportation resource progress.

FIG. 5 illustrates an example computer architecture 500 that facilitates requesting a transportation resource and being updated about transportation resource progress. As depicted, computer architecture 500 includes entity 501, shipment management and tracking system 201, and carriers 541. Shipment management and tracking system 201 includes database 202, request computation module 311, carrier assignment module 312, and update module 391. Entity 501 includes leg determination module 512, and carrier request formulation module 502. Carriers 541 can include any of carriers 216.

In general, update module 391 is configured to update entities with respect to the progress of transportation resource completing transportation legs. Update module 391 can access updates from database 202 and send the updates to appropriate entities.

Leg determination module 512 can determine can receive data associated with a shipment and derive one or more transportation legs of the shipment. Leg determination module 512 can indicate transportation legs to carrier request formulation module 502. Leg determination module 512 can also track the progress of transportation legs based on updates received from shipment management and tracking system 201.

Carrier request formulation module 502 can receive transportation legs from leg determination module 512. Carrier request formulation module 502 can formulate carrier requests to move items (e.g., one or more containers and/or one or more pallets) between locations associated with a transportation leg (and as part of an overall shipment). Carrier request formulation module 502 can submit formulated carrier requests to shipment management and tracking system 201.

Figure 6:
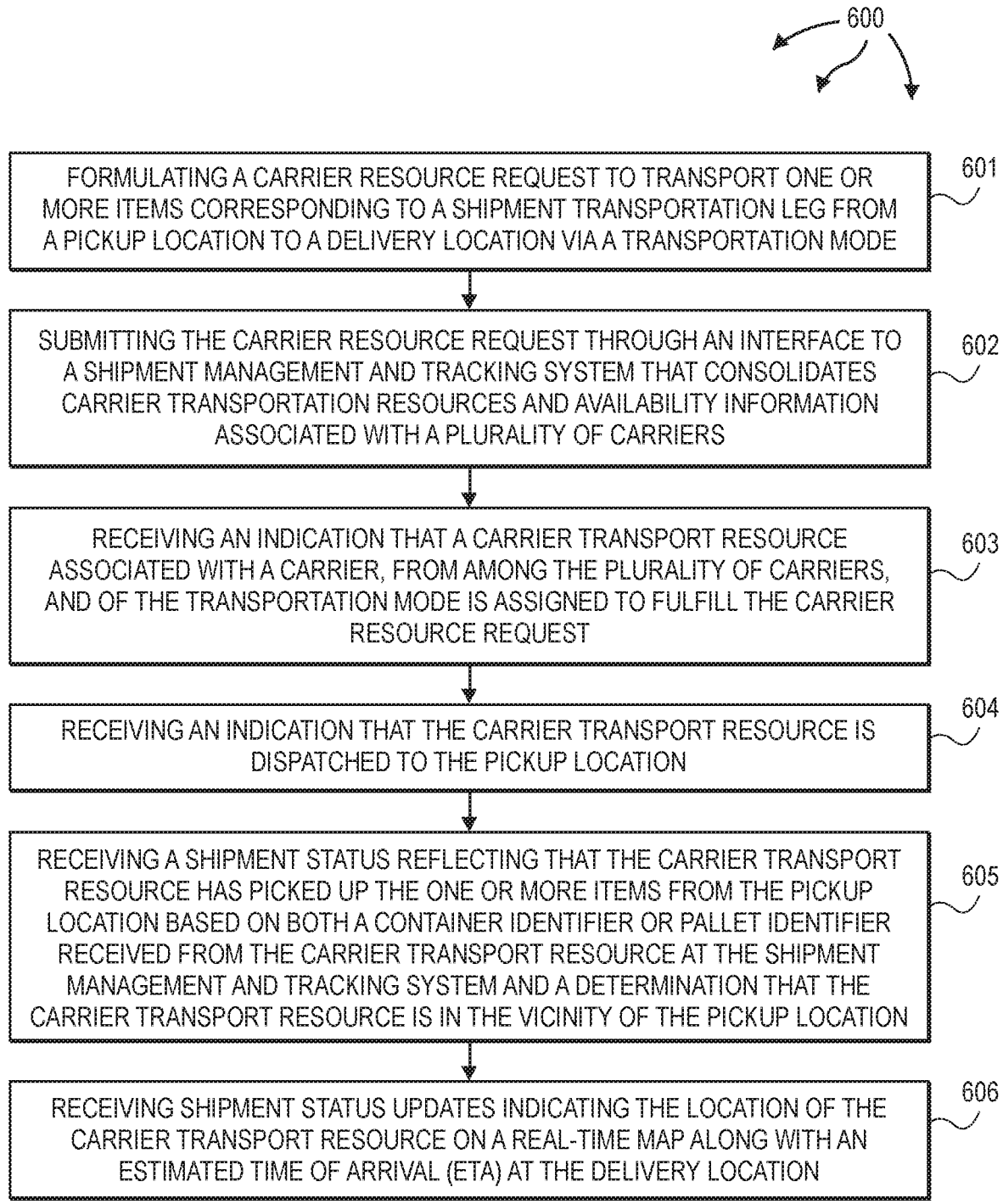
FIG. 6 illustrates a flow chart of an example method for requesting a transportation resource and being updated about transportation resource progress.

FIG. 6 illustrates a flow chart of an example method 600 for requesting a transportation resource and being updated about transportation resource progress. Method 600 will be described with respect to the components and data depicted in computer architecture 500.

Leg determination module 512 can receive shipment 511. Shipment 511 can indicate that one or more items (e.g., one or more containers and/or one or more pallets) are to be transported from an origin to a destination via one or more transportation legs (included leg 513) possibly of different transportation modes. Leg determination module 512 can track transportation legs of shipment 511.

When one leg is completed, leg determination can send a next leg to carrier request formulation module 502. For example, leg determination module 512 can receive shipment update 571 from shipment management and tracking system 201. Shipment update 571 can indicate that transportation associated with a last initiated transportation leg of shipment 511 was satisfactorily completed. Leg determination module 512 can subsequently send leg 513 to carrier request formulation module 502.

Method 600 includes formulating a carrier resource request to transport one or more items corresponding to a shipment transportation leg from a pickup location to a delivery location via a transportation mode (601). For example, carrier request formulation module 502 can formulate carrier request 521 to satisfy leg 513. Carrier request 521 includes pickup location 522, delivery location 523, (container and/or pallet) ID(s) 524, and mode 526. Thus, carrier request 521 requests pick up of one or more items (e.g., one or more containers and/or one or more pallets) identified by ID(s) 124 from pickup location 522 and delivery of the one or more items to delivery location 523 via transportation mode 526.

Pickup location 522 can be a manufacturer, a producer, an airport, a sea port, a train terminal, or a yard. Delivery location 523 can be an airport, a sea port, a train terminal, a yard, or a market.

Method 600 includes submitting the carrier resource request through an interface to a shipment management and tracking system that consolidates carrier transportation resources and availability information associated with a plurality of carriers (602). For example, carrier request formulation module 502 can submit carrier request 521 through interface 527 to shipment management and tracking system 201.

Interface 527 can utilize one or more connectors, converters, formatters, etc. to convert carrier request 521 to the unified data format. Interface 527 can forward carrier request 521 to request computation module 311. Request computation module 311 can compute request 531 from carrier request 531. As depicted, request 531 includes pickup location 522, delivery location 523, (container and/or pallet) ID(s) 524, and mode 526.

In some aspects, for compatibility with carriers 541, request computation module 311 can re-formulate fields or data contained therein in carrier request 521. As such, fields and contained data included in carrier request 521 and request 531 can differ. For example, request computation module 311 can remove, merge, or split fields in carrier request 521. Request computation module 311 can also add fields to request 531 that were not included in carrier request 521. For example, request 531 may also include a pickup timeslot.

Request computation module 311 can send request 531 to carrier assignment module 312. Carrier assignment module 312 can assign transportation resource 542 (e.g., a trucker) to satisfy request 521 by transporting the one or more containers and/or one or more pallets from pickup location 522 to delivery location 523. Carrier assignment module 312 can assign transportation resource 542 based on transportation resource 542 transporting in accordance with mode 526 (e.g., ground) and the availability of transportation resource 542 (e.g., time, location, etc.).

Carrier assignment module 312 can store assignment 532 in database 202. Assignment 532 indicates that transportation resource 542 is assigned to request 531. Shipping management and transportation system 201 can update entity 501 with information from assignment 532.

Carrier assignment module 312 can send allocation request 534 to carriers 541. One or more connectors, converters, formatters, etc. can be used to convert allocation request 534 into a format compatible with carriers 541. In response to allocation request 534, carriers 541 can allocate 543 transportation resource 542 to satisfy request 531 (and thus 521).

In response to allocation of transportation resource 542, carriers 541 can send a confirmation message back to carrier assignment module 312. Carrier assignment module 312 can indicate the confirmation in assignment 532. Shipping management and transportation system 201 can update entity 501 with confirmation that transportation resource 542 has been allocated to request 531 (and thus 521).

Carrier assignment module 312 can notify transportation resource of pickup location 522, delivery location 523, and ID(s) 524. The notification can also include a pickup timeslot. One or more connectors, converters, formatters, etc. can be used to convert the notification into a format compatible with systems of transportation resource 542. Pickup location 522, delivery location 523, ID(s) 524, and a time slot can be presented on a screen at transportation resource 542. A navigation system can provide directions to from a current location to pickup location 522 and can provide directions from pickup location 522 to delivery location 523.

Through the interface 333, transportation resource 542 can send updates 544 to shipment management and tracking system 201 with respect to progress in completing request 531. One or more connectors, converters, formatters, etc. can be used to convert updates 544 into the uniform data format. Updates can include dispatch to pickup location 522, when the one or more items are picked up, real-time status in transit from pickup location 522 to delivery location 523, when the one or more items are delivered to the delivery location, GPS coordinates, etc.

Updates can be stored at database 202. From time to time or upon request, shipment management and tracking system 201 can access updates from database 202 and send the updates to entity 501 (and/or other interested entities). One or more connectors, converters, formatters, etc. can be used to convert updates 544 into a format compatible with entity 501 (and/or other interested entities).

Method 600 includes receiving an indication that a carrier transport resource associated with a carrier, from among the plurality of carriers, and of the transportation mode is assigned to fulfill the carrier resource request (603). For example, update module 391 can derive assignment notification 576 based on assignment 532. Update module 391 can send assignment notification 576 to entity 501. Assignment notification 576 can indicate that transportation resource 542 was assign to fulfill request 531 (and thus carrier request 521). One or more connectors, converters, formatters, etc. can be used to convert assignment notification 576 into a format compatible with entity 501. Entity 501 can receive assignment notification 576 from shipment management and tracking system 201.

Method 600 includes receiving an indication that the carrier transport resource is dispatched to the pickup location (604). For example, update module 391 can derive dispatch notification 574 based on allocation 543 and/or updates 544. Update module 391 can send dispatch notification 574 to entity 501. Dispatch notification 574 can indicate that transportation resource 542 was dispatched to pickup location 522. One or more connectors, converters, formatters, etc. can be used to convert assignment notification 574 into a format compatible with entity 501. Entity 501 can receive dispatch notification 574 from shipment management and tracking system 201.

Method 600 includes receiving a shipment status reflecting that the carrier transport resource has picked up the one or more items from the pickup location based on both a container identifier or pallet identifier received from the carrier transport resource at the shipment management and tracking system and a determination that the carrier transport resource is in the vicinity of the pickup location (605). For example, update module 391 can derive shipment status 572 based on updates 544. Update module 391 can send shipment status 572 to entity 501. Shipment status 572 can indicate that transportation resource 542 has picked up one or more containers and/or one or more pallets from pick up location 522. For example, updates 544 can indicate a trucker scanned or enter ID(s) 524 while GPS indicated the trucker was at pick up location 522. One or more connectors, converters, formatters, etc. can be used to convert shipment status 572 into a format compatible with entity 501. Leg determination module 512 can receive shipment status 572 from shipment management and tracking system 201.

Method 600 includes receiving shipment status updates indicating the location of the carrier transport resource on a real-time map along with an estimated time of arrival (ETA) at the delivery location (606). For example, update module 391 can derive shipment update 573 based on updates 544. Update module 391 can send shipment update 573 to entity 501. Shipment update 573 can indicate the location of transportation resource on a real-time map along with ETA at delivery location 523. For example, updates 544 can indicate GPS coordinates of transportation resource 542. One or more connectors, converters, formatters, etc. can be used to convert shipment update 573 into a format compatible with entity 501. Leg determination module 512 can receive shipment update 573 from shipment management and tracking system 201.

Based status and/or updates, leg determination module can determine that request 531 (and thus carrier request 521) has be fulfilled. As such, leg determination module 512 can send a next leg to carrier request formulation module.

Workflow Examples

As described, a shipment can be composed of a number of smaller workflows, each handling a specific workflow logistic task. Each workflow logistic task can be broken up into a set of known activities depending on responses from appropriate entities.

In one example, a number of Containers being shipped from an originating country to a destination country. A purchase order has been created for the manufacturing of goods for an importer. Raw material might need to be delivered to an exporter so that manufacturing can be started. A trucker picks up a chassis (if appropriate), picks up an empty container and delivers it to the Exporter for loading of manufactured goods to be shipped to an international destination.

After the container is "stuffed" with the manufactured goods, it is sealed by the Exporter. Another trucker (not necessarily the same one) picks up the "stuffed" container and transports it to a container yard of the port of lading. The container gets loaded on a vessel as part of the overall vessel loading schedule. Once the vessel loading is completed, it departs for its destination port or port of unlading. This leg of the transportation can take several weeks until it arrives to the destination port. When the container has arrived and cleared customs, the container is picked up by a Trucker to take the Container to the final warehouse destination.

In another example, a pallet of goods is being shipped from an originating country to a destination country. Manufactured products are arriving from a manufacturer to a warehouse where is it being stored temporarily. The warehouse team prepares a pallet with goods to be transported to an international receiver. A trucker picks up the pallet (the shipment) and transports it to the origination airport. Alternately, the trucker/freight forwarder collects the pallet(s) and takes them to the freight forwarder warehouse for consolidation, creation of shipment documentation (i.e. Bill of Lading (BOL), airwaybill, commercial invoice and others), preparation, and staging.

When paperwork for the shipment is prepared, entered and booked on a flight, a trucker can be called to collect for transport of the shipment to the airport. The shipment gets loaded on the airplane when the airplane is available and ready for the shipment. When the airplane loading is completed, it departs for its destination. When the airplane arrives at a destination airport, the shipment is unloaded and clears customs. The shipment is then be picked up by another trucker to take it to the final destination.

In a further example, a number of containers are shipped from one country to another country through a third country by a combination of trucks, train, and container ship. Manufactured goods are e "stuffed" into one or multiple containers. Each container is picked up, asynchronously or one by one, by a trucker and delivered to a train yard. It can be multiple truckers and/or one trucker that is performing that initial delivery. When all the containers are at the train yard, the containers are loaded on a train. The train leaves according to its schedule and arrive at the port where the containers are being off loaded and placed in the container yard.

Thus, a trucker may be used to transport a container or one or more pallets for any "mile" of a shipment. A shipment management and tracking system (e.g., 201) can handle any combination. The shipment management and tracking system can handle pickup and delivery of empty containers as well as loaded containers or pallets. The described shipment workflows illustrate some of those examples. A Trucker can be assigned to one or many of those shipments "legs" that are part of a Shipment.

Further, there can be many transportation legs of any type (land, air, sea) that are "stitched" together making up the complete logistics chain. A shipment management and tracking system (e.g., 201) can handle any number of such transportation "legs" combinations.

A shipment management and tracking system (e.g., 201) can use an application to schedule shipment pickup and delivery at the port yards and/or train terminals by interfacing with the specific port yard/train terminal calendaring interface when that is available. Alternately scheduling can be provided via a calendar interface to a customer representative who is managing trucker schedules. The application can manage the underlaying interface. As such, the customer does not have to worry about which port, specific port yard, train terminal software interface to use.

The application can manage:
1. The pickup and delivery of an empty container from any location to any location i.e. the pickup of an empty container from a port yard and delivery to a manufacturer or a pickup of an empty container from an Importer and delivery to a port yard or train terminal
2. Transport of a Shipment to/from a sea port yard/train terminal, manufacturer, exporter or any other location to a different location
3. Return of an unloaded empty container to a port yard/train terminal Pickup/delivery can locations can be in any country. That is, the initial empty container pickup and delivery can be in China, deliver the "stuffed" container from manufacturer to the port yard in China for sea transport, pick up a loaded container from port yard in United States and deliver it to a warehouse, and finally take the unloaded empty container back to the port yard, once it is unloaded.

The application can display near real-time location status of the shipment during the transportation and continuously informs and updates the customer about when they can expect the shipment to arrive at the target destination, which can be, for example, a manufacturing facility, a port or a warehouse or any other interim or final location.

The application can give a trucker ongoing traffic instructions from the origination to the destination.

Trucker Mobile Application

A trucker (e.g., transportation resource 332 or 542) can download a trucker mobile application to a mobile device. The trucker can provide basic contact information (name, mobile number, email), preferences (e.g., language), and an optional picture and start to use the trucker mobile application right away when GPS is enabled for the trucker mobile application. An authentication/authorization back end can send the trucker a text message with a One Time Password ("OTP") to the mobile device. The OTP can be used by a shipment management and tracking system (e.g., 201) to validate the trucker. The trucker mobile application can be automatically updated by the shipment management and tracking system.

The shipment management and tracking system can calculate how well a trucker performed during a transportation job. Customers can also be queried for feedback on how the trucker performed their work for them. The customer can be asked to score a trucker for each delivery they perform when it has been completed, and that data goes into the overall calculation of the trucker score. Trucker scores can be presented on a different customer application so that it is not presented in front of the trucker and hence could be "influenced" potentially.

A Trucker Score can be on a scale from 1 (low)-5 (high). A trucker's current Trucker Score can be presented to the trucker on a home page of the trucker mobile application. A customer can be presented with a Trucker Score for every trucker they are using.

Trucker performance can be automatically calculated when they are managing a delivery or pickup. A shipment management and tracking system can score each Trucker on a 1-5 range where 5 is the highest. Thus, it can be determined if a trucker is not performing to customer satisfaction levels. Customers can take action to not use a trucker if the scores are consistently below a minimum required average score (with a minimum number of completed Trucker assignments). The minimum required average score is configurable.

Trucker score measurement is made automatically by a shipment management and tracking system. Examples of the measure of an individual trucker score can include:
  Responsiveness during the delivery/pickup process
  Overall actual timing for the delivery/pickup process compared to projected time
  Did administration have to intervene during the delivery/pickup process
  Any major deviation(s) from the scheduled driving instructions
  Any unplanned stops beyond what the traffic situation requires, filling up at gas station, short restroom break etc.

A shipment management and tracking system can calculate a current Trucker Score as a composite of the Customer feedback and an internal Trucker Score calculation, which has a higher velocity. The algorithm can properly weight the amount of Customer feedback, if any, against the internal calculations for an appropriate Trucker Score.

The scheduling of the Truckers activity can be managed by the trucker and importer logistics person/teams. A shipment management and tracking system can supplement their current capabilities to make it easier to schedule and manage schedules for Truckers. A customer application can be used to request truckers (or other transportation resources). The trucker mobile application can be a "receiver" for any scheduling outputs.

Trucker pickup or delivery at a port yard/train terminal is can be scheduled by a Customer for pickup and delivery of a shipped container or by the exporter/manufacturer for the pickup of an empty container for delivery to their location. Customers and/or exporters/manufacturers can leverage a customer application that presents available slots in a customer user interface. The customer application manages the process directly with the pickup or delivery port yard/train terminal and can render available options to the customer.

If the port yard/train terminal has an electronic interface, a shipment management and tracking system can leverage the electronic interface to manage the calendaring schedule.

When a customer has selected an available timeslot for pickup, the pickup information is sent to a Trucker via email and text as well as displayed on the tucker mobile application and the customer application. The customer can re-schedule and/or cancel a scheduled pickup at any time. If there is a change to a scheduled pickup, information is sent to the trucker via email and text as well as displayed on the trucker mobile application and the customer application.

If a port/train yard/other pickup location does not have an Application Program Interface (API) that the shipment management and tracking system can utilize for scheduling pickups electronically, the Trucker can coordinate the pickup of a shipment at the location. Depending on the port/train yard/other location facilities capabilities, scheduling can be done by several methods including utilizing the ports/train yards/other location shipment pickup scheduling web interface or by calling them directly. A trucker can inform a customer about the scheduled time slot via their normal communication method. The Customer can choose to put the scheduled pickup time on the customer application, even if the scheduling is not done through the customer application.

The trucker mobile application can show a list of any existing scheduled pickups and/or deliveries. The trucker does not have to select any of them to perform his/her duties. The trucker mobile application (through interoperation with the shipment management and tracking system) takes care of the coordination automatically.

The following information can be displayed on at the trucker mobile application:
Type (pickup or delivery)
Shipment identification (i.e. Container id, Pallet id)
Shipment type(s)
Pickup and/or delivery location(s) addresses and contact information
Date and time for the job(s)
Customer name, address and contact information (could be exporter as well as importer)

The target destination can change at any given time depending on the situation, such as, for example, deliver a shipment to a different warehouse than originally planned for, pick up a Pallet from a different train yard, or pick up a Shipment from a Container Exam Station ("CES") location instead of where the Shipment was initially offloaded from a vessel.

Shipment Identification
A trucker can attempt to identify a container using the following workflow:
The Trucker initiates the workflow by entering one of the following identifiers into the trucker mobile application:
Taking a picture of the container identification, or
Typing in the 11-character container id
Should the Trucker not have their GPS tuned on, the Trucker may be prompted to turn it on prior to next step. The consignee can be notified if the trucker does not enable GPS. Thus, the consignee can take necessary actions with trucker dispatch/management.
Container identification and shipment determination can be done by either of the two or a combination of the two below:
Taking a container picture
The Trucker points the Truckers mobile phone towards the upper right section of the container where the container identification is and takes a picture of it.
The trucker mobile application performs OCR on the picture
The trucker mobile application displays the resulting container id to the trucker.
The trucker mobile application determines if the resulting container id seem to have a "high" probability to be correct based on:
The initial 3 alphanumeric characters matches what is in an administrator database
The $4^{th}$ character is a 'U'
The $5^{th}$ to $10^{th}$ characters are numeric
The $11^{th}$ character matches the container id check digit calculation algorithm
The above container id is a match in a shipment management and tracking system database (e.g., 202) and it is confirmed to match a Shipment with the actual arrival time in close time proximity to current time. Hence, we expect the container to be in a port yard at this point.
If there are any issues with the container id, the trucker mobile application can highlight the alphanumeric/digits that is/are in question and prompt the trucker to edit it/them by presenting an alphanumeric keyboard on the trucker mobile application underneath the container id. The Trucker can correct the alphanumeric/digits that are needed and select the "Done" button on the trucker mobile application when it is completed. The trucker mobile application can then perform the same process that is described above to try to identify the container to have a "high" probability. This process can be repeated until the trucker either hits "Cancel" on the trucker mobile application or until there is a "high" probability hit as described above.
Typing in the 11-character container id
This option is for the trucker that may prefer to type in the container ID instead of taking a picture. It could also be used in case his camera is not working properly, inclement weather, lightning is not good enough or any other reason that makes taking a picture and performing OCR on it is less effective.
When the trucker has entered the 11 alphanumeric character, the trucker selects "Done" on the trucker mobile application.

The trucker mobile application then determines if the resulting container id seem to have a "high" probability to be correct based on:
The initial 3 alphanumeric characters matches what is in the shipment management and tracking system database (e.g., 202)
The 4$^{th}$ character is a 'U'
The 5$^{th}$ to 10$^{th}$ characters are numeric
The 11$^{th}$ character matches the container id check digit calculation algorithm
The above container id is a match in the shipment management and tracking system database and it is confirmed to match a shipment with the actual arrival time in close time proximity to current time. Hence, we expect the container to be in the port yard at this point.
If there are any issues with the container id, the trucker mobile application can highlight the alphanumeric/digits that is/are in question, if any, and prompt the trucker to edit it/them by presenting an alphanumeric keyboard on the trucker mobile application underneath the container id. The trucker can correct the alphanumeric/digits that are needed and select the "Done" button on the trucker mobile application when it is completed. The trucker mobile application can then perform the same process that is described above to try to identify the container to have a "high" probability. This process can be repeated until the trucker either hits "Cancel" on the trucker mobile application or until there is a "high" probability hit as described above.

A trucker can attempt to identify a pallet ID (e.g., barcode, QR code, other identifying code, etc.) using the following workflow:
The Trucker initiates the workflow by entering one of the following identifiers into the trucker mobile application:
Taking a picture of the pallet identification (Pallet ID), or
Typing in the pallet id
Should the Trucker not have their GPS tuned on, the Trucker can be prompted to turn it on prior to next step. The consignee can be notified if the trucker does not enable GPS. This allows the consignee to take necessary actions with trucker dispatch/management.
Once the step above has been performed, the next steps are to perform Pallet identification and the shipment it belongs to. This can be done by either of the two or a combination of the two below.
Taking a pallet picture
The trucker points the truckers mobile phone towards the section of the pallet where the pallet identification is (Pallet ID) and takes a picture of it.
The trucker mobile application performs OCR on the picture
The trucker mobile application displays the resulting Pallet Id to the trucker.
The trucker mobile application then determines if the resulting Pallet id seem to have a "high" probability to be correct based on:
The above Pallet Id is a match in the shipment management and tracking system database (e.g., 202) and it is confirmed to match a shipment with the actual arrival time in close time proximity to current time. Hence, we expect the pallet(s) to be in a specific location at this point.
If there are any issues with the Pallet Id, the trucker mobile application can highlight the alphanumeric/digits that is/are in question and prompt the trucker to edit it/them by presenting an alphanumeric keyboard on the trucker mobile application underneath the Pallet Id. The Trucker can correct the alphanumeric/digits that are needed and select the "Done" button on the trucker mobile application when it is completed. The trucker mobile application can then perform the same process that is described above to try to identify the Pallet to have a "high" probability. This process can then be repeated until the Trucker either hits "Cancel" on the trucker mobile application or until there is a "high" probability hit as described above.
Typing in the Pallet Id
This option is for the Trucker that prefers to type in the Pallet Id instead of taking a picture. It could also be used in case his camera is not working properly, inclement weather, lightning is not good enough or any other reason that makes taking a picture and performing OCR on it is less effective.
When the Trucker has entered the characters, the Trucker selects "Done" on the trucker mobile application.
The trucker mobile application then determines if the resulting Pallet Id seem to have a "high" probability to be correct based on:
The above Pallet Id is a match in the shipment management and tracking system database and it is confirmed to match a Shipment with the actual arrival time in close time proximity to current time. Hence, we expect the pallet to be around this location at this time.
If there are any issues with the Pallet Id, the trucker mobile application can highlight the alphanumeric/digits that is/are in question, if any, and prompt the trucker to edit it/them by presenting an alphanumeric keyboard on the trucker mobile application underneath the Pallet Id. The Trucker can correct the alphanumeric/digits that are needed and select the "Done" button on the trucker mobile application when it is completed. The trucker mobile application can then perform the same process that is described above to try to identify the Pallet Id to have a "high" probability. This process can then be repeated until the trucker either hits "Cancel" on the trucker mobile application or until there is a "high" probability hit as described above.

At this point, the Shipment is either a "hit" (known Shipment) in our database or not (Unknown Shipment). Should a Container not exist in a shipment management and tracking system database but have a Shipment id that seems to be calculated correct, the trucker mobile application can inform the Trucker about the shipment not being managed by the shipment management and tracking system database.

The Trucker mobile application can display a target location address that the trucker can enter in manually instead of automatically. Once the Trucker has entered the delivery address and selected "Go", the trucker mobile application can give driving instructions to the delivery address to the Trucker. The trucker mobile application can also send the Shipment id and Trucker ID to the shipment management and tracking system so that proactive marketing/sales can be initiated to the originators of the shipment, if possible.

When a shipment is located, a customer interface can be rendered as follows:

The Shipment status is updated to reflect that the trucker has picked up the shipment and is on the way to the delivery location (which can be a port yard, a train terminal, a manufacturer, an exporter, a Customer; or any other location depending on the specific workflow)

As a real-time map that graphically displays the location of the truck that is picking up the shipment and delivering it.

The ETA and the shipment details (manufacturer, BOL/AWB, Carrier, Shipment content, packaging slip and any additional details), the Trucker contact information and the Shipment ID.

Color coded status of the delivery (delay, on time, ahead of schedule).

Type of unloading (live unload or drop off), if it is a container unloading workflow All Shipments that are in a Trucker pickup/delivery stage will be rendered in the Customer user interface.

Customer will be able to enter the dock door they wish the trucker to pull into upon arrival.

A Customer filter, same as on the main Shipment landing page, for the Customer to filter on.

A Customer search function, same as on the main Shipment landing page, for the

Customer to search using any keyword(s) the Customer likes and the search results will be rendered in the user interface.

The Trucker user interface can be rendered as follows:

As a real-time map that graphically displays the location of the truck with directions to the pickup/delivery location The ETA and the Shipment details, the Customer address and contact information and the Shipment ID Type of unloading (live unload or drop off), if it is a container unloading workflow Should the Trucker not follow directions or "stall" in a location beyond what the trucker mobile application expects (a configurable value), the Trucker can be informed about the unexpected delay in the application user interface.

When a trucker arrives at the pickup/delivery point, the trucker mobile application can inform the trucker via the user interface and/or with audio prompt ("You have arrived at the destination" in the currently selected language). The destination could, for example, include a specific dock door.

Additional Workflows

Trucker empty container pickup and exporter delivery workflow:

The Trucker has been instructed, either by the trucker mobile application or through any other communication method, to pick up an empty container and transport it to a delivery location, where the container is to be "stuffed" with goods to be shipped.

The trucker mobile application can display the empty container id that the trucker is picking up.

The trucker can leverage the trucker mobile application to get directions to the pickup place by initiating the sequence by selecting the "job" on the trucker mobile application. This can start the Trucker guidance process.

The Trucker can follow the driving instructions to the delivery location per the workflow above ("Known shipment Customer and Trucker user interface")

Trucker loaded container exporter pickup and delivery to port yard/train terminal workflow:

The trucker is instructed, either by the trucker mobile application or through any other communication method, to pick up a shipment from an exporter and transport it to the delivery location, a port yard or train terminal or any other location The Trucker can leverage the trucker mobile application to get directions to the pickup place by initiating the sequence by selecting the "job" on the trucker mobile application. This can start the Trucker guidance process.

The trucker mobile application can display the Shipment ID that the Trucker is picking up.

The Trucker can follow the driving instructions per the workflow above ("Known shipment Customer and Trucker user interface") to get to the pickup location.

When the Trucker has arrived at the pickup location, the Shipment is loaded on the Truckers trailer. The Trucker might also be directed by the port or train yard to get a chassis as well if the Trucker does not have a chassis at the point of pickup and it is transporting a Container.

The Trucker performs one of the Shipment identification workflows above.

The Trucker will then follow the driving instructions to the delivery location per the workflow above ("Known shipment Customer and Trucker user interface")

Unloading the Shipment in port yard/train terminal/other location workflow:

For a port yard workflow:

A Trucker arrives at the port and get access through the trucking lanes to deliver the shipment by presenting appropriate credentials. Once the Trucker has been allowed entry to the port yard, the Trucker drives to the specified delivery location in the port yard where the container will be unloaded.

For a train terminal workflow:

The Trucker arrives at the train terminal and get access to pick up the shipment by presenting appropriate credentials. Once he has been allowed entry to the train terminal, the Trucker drives to the specified pickup location in the train yard where the container will be unloaded.

For any other location workflow:

The Trucker arrives at the location and get access to pick up the shipment, if needed by the specific rules of the location. Once he has been allowed entry to the pickup location, the Trucker drives to the specified pickup location where the Shipment will be unloaded.

When the unloading is completed, the Trucker completes the movement by selecting "Delivered" on the trucker mobile application. At this point, the port yard/train terminal has taken ownership of the Shipment content assets. This completes the unloading stage.

Trucker loaded container pickup and delivery to Customer workflow:

For a port yard workflow:

The Trucker arrives at the port and get access through the trucking lanes to pick up the shipment from the appointment time/window is has received. Once he has been allowed entry to the port yard, the Trucker drives to the specified pickup location in the port yard.

For a train terminal workflow:
  The Trucker arrives at the train terminal and get access to pick up the shipment. Once he has been allowed entry to the train terminal, the Trucker drives to the specified pickup location in the train terminal.
  The container is loaded on the Truckers trailer.
  The Trucker performs the "Container identification workflow" above.

Unloading the loaded container at Customer location workflow. This workflow applies to a shipment that delivers a loaded container to a location to be unloaded, either right away (live unload) or drop off. A shipment management and tracking system sends the type of unload to the Trucker so that when the Trucker arrives at the destination, the Trucker knows the unload type. When the Trucker has arrived at the destination (typically a warehouse or Truckers yard), the next step depends on the unloading type per the following:

1. Live Unload
  a. The warehouse team unloads the container. The trucker could help unload or move freight within the container or truck and upon completion of job.
  b. The warehouse manager acknowledges the delivery by electronically signing the receipt of the container on the trucker mobile application.
2. Drop-off
  a. The warehouse manager acknowledges the delivery by electronically signing the receipt of the container on the trucker mobile application.

This completes the unloading stage. At this point, the Customer has taken ownership of the delivery of the container content assets. The Customer still has the ownership and asset responsibility of the empty or full container (if it is not a live unload). Once the empty container has been delivered back to the port yard, the container asset ownership changes hands and the Customer is no longer associated with it nor has the liability of it.

The receiving party (i.e. the warehouse manager) has the option to select a customer satisfaction score of the Trucker delivery on the Customer application when the delivery is completed or at a later point in time. A shipment management and tracking system can save the customer satisfaction score in a database (e.g., 202) where it can be used for reporting and analytical purposes.

The receiving party (i.e. the warehouse manager) has the option to "tip" the Trucker as well if they think it is deserved.

The Shipment is not complete yet as the empty Container has not been delivered back to the Port just yet. The pickup and delivery back to the port yard of the delivered Container can be performed by the same or different Trucker and that is could be performed asynchronously.

The shipment management and tracking system continues to keep track of the delivered Container until it has successfully been delivered back to the port yard.

When the Trucker departs the warehouse, the following scenarios are possible:
1. The Trucker leaves without an empty Container
2. The Trucker leaves with the same Container that was just unloaded
3. The Trucker picks up and departs with a different empty container The trucker mobile application displays the three above options to the Trucker. The Trucker selects one of the options presented on the trucker mobile application and then performs the workflow below based on his choice.

Leave without empty Container. The Shipment is not complete yet as the empty Container has not been delivered back to the Port just yet. The pickup and delivery back to the port yard of the delivered Container can be performed by the same or different Trucker and that is could be performed asynchronously. The Trucker leaves the warehouse and the delivery workflow is completed. The Shipment can be closed at a later stage when the same or a different Trucker picks up and delivers the empty Container back to the port yard.

Leave with the same Container that was just unloaded. The Trucker acknowledges the pickup of the same empty Container by electronically acknowledging it on the trucker mobile application. The trucker mobile application looks up the port yard or train yard that the Container is going to be delivered to, which is the original port yard or train yard pickup location. The Trucker user interface is rendered as follows:
  As a real-time map that graphically displays the location of the truck with directions to the drop off location of the empty Container.
  The ETA, the port yard address, contact information and the container ID.
  Should the Trucker not follow directions or "stall" in a location beyond what the trucker mobile application expects (a configurable value), the Trucker can be prompted about the unexpected delay in the application user interface and urged to continue the trip.

When the Trucker has arrived at the destination, the trucker mobile application can inform the Trucker via the user interface as well as with audio prompt ("You have arrived at the destination"). The Trucker acknowledges the delivery by selecting "Done" on the trucker mobile application. The Trucker leaves the destination location. This completes the departure stage. The original Shipment is complete as the empty Container has been delivered back to the Port.

The Trucker picks up and departs with a different empty Container. The Trucker uses the trucker mobile application to scan the empty Container that the Trucker is picking up. The trucker mobile application can prompt the Trucker similarly to the way as it does for a loaded Container. Should the Trucker not have their GPS tuned on, the Trucker can be prompted to turn it on prior to the next step. The Trucker initiates the empty container delivery use case by entering one of the following identifiers into the trucker mobile application:
  Taking a picture of the container identification, or
  Typing in the 11-character container id
This identification process is essentially the same as described above under the "Trucker workflow". At this point, the container is either a "hit" in our database or not.
  Unknown Shipment. Should the empty container not exist in a shipment management and tracking system but have a container id that seems to be calculated correct, the mobile trucker application can inform the Trucker about the shipment not being managed and that tracking and giving directions is not possible and perform no further actions to the Trucker. The trucker mobile application can send the container id to the shipment management and tracking system so that proactive marketing/sales can be initiated to the originators of the shipment, if possible.
  Known Shipment. At this point, the empty container and relevant information is known by the shipment management and tracking system
    The Customer user interface is rendered as follows:
      As a real-time map that graphically displays the location of the truck and delivery location
      The ETA, the Trucker contact information and the container ID Color coded status of the empty delivery (delay, on time, ahead of schedule)

All containers that are in this final Trucker empty container delivery stage will be rendered in the user interface.

The Customer can use the "global" filter to drill down further at any time

The Trucker user interface is rendered as follows:

As a real-time map that graphically displays the location of the truck with directions to the drop off location at the port yard The ETA and the shipment details, the Customer address and contact information and the container ID Should the Trucker not follow directions or "stall" in a location beyond what the trucker mobile application expects, the Trucker can be informed about the unexpected delay in the application user interface Once the Trucker has arrived at the empty container delivery location, the trucker mobile application can inform the Trucker via the user interface as well as with audio prompt ("You have arrived at the destination"). The Trucker acknowledges the delivery by selecting "Done" on the trucker mobile application. The Trucker leaves the port yard. The original Shipment that had this empty Container is now complete as the empty Container has been delivered back to the Port.

Unscheduled Trucker pick up of empty Container. This use case is for the scenario when a Trucker picks up an empty container without warehouse involvement and/or knowledge, for example, unscheduled during a weekend when there are no representatives from the Customer. The Trucker can follow the process as above as described under: "The Trucker picks up and departs with a different empty container". Should the Trucker not perform those actions, a shipment management and tracking system can still close a Shipment by the following process flow:

The shipment management and tracking system receives a notification from the port that an empty container has been delivered to the port yard.

The shipment management and tracking system application uses the Container id to lookup the Shipment in the database.

Unknown Shipment. Should the empty Container not exist in the shipment management and tracking system but have a container ID that seems to be calculated correct, the shipment management and tracking system application can log the situation for further investigation.

Known Shipment. At this point, the Shipment and relevant information is known by the shipment management and tracking system. The shipment management and tracking system can perform the following:

Close out the Shipment as all steps have been completed

Log the notion that the Trucker did not use the trucker mobile application

Inform the Customer about the out of process activity

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, shipment information, calendar information, other information, carrier requests, transportation resource assignments, allocation requests, transportation resource allocations, transportation resource notifications, carrier information, shipment updates, shipment status, assignment notifications, dispatch notifications, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, shipment information, calendar information, other information, carrier requests, transportation resource assignments, allocation requests, transportation resource allocations, transportation resource notifications, carrier information, shipment updates, shipment status, assignment notifications, dispatch notifications, etc.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer system comprising:
  a processor;
  system memory coupled to the processor and storing instructions configured to cause the processor to:
    access shipping information related to a shipment from one or more of: a manufacturer, a producer, an importer, an exporter, a freight forwarder, a market, or a government entity in a first data entity format;
    convert the shipping information from the first data entity format into a uniform format;
    access other shipping information related to the shipment from one or more of: an airport, a sea port, a train terminal, or a yard in a second entity data format different from the first data entity format;
    convert the other shipping information from the second data entity format into the uniform format;
    after converting the shipping information, store the shipping information in the uniform format in a database;
    after converting the other shipping information, store the other shipping information in the uniform format in the database;
    stitch together a plurality of transportation shipments segments, including a first transportation segment and a second transportation segment, for transporting an item, and based on an anonymized version the shipping information stored in the database in the uniform format and based on an anonymized version the other shipping information stored in the database in the uniform format, including:
      compute, through a calendar interface associated with an entity, the first transportation segment leg including pickup at a pickup location and transport to a delivery location based on the information and the additional information accessed from the database in the uniform format, the entity selected from among: the manufacturer, the producer, the airport, the sea port, the train terminal, or the yard;
      electronically access carrier availability information associated with a plurality of carriers and indicating availability of a plurality of carrier transportation resources from the database in the uniform format;

assign a first carrier transportation resource, from among the plurality of carrier transportation resources, to transport the item from the pickup location to the delivery location based on a transportation mode of the first carrier transportation resource and availability of the first carrier transportation resource;

allocate the first carrier transportation resource to transport the item from the pickup location to the delivery location;

notify an interface at the allocated first carrier transportation resource about the assignment;

compute, through a calendar interface associated with the entity, the second transportation segment leg including pickup at the delivery location and transport to a further location based on the information and the additional information accessed from the database in the uniform format;

after allocating the first carrier transportation resource, again electronically access the carrier availability information associated with the plurality of carriers and indicating availability of the plurality of carrier transportation resources from the database in the uniform format;

assign a second carrier transportation resource, from among the plurality of carrier transportation resources, to transport the item from the delivery location to the other location based on another transportation mode of the second carrier transportation resource and availability of the second carrier transportation resource, the other transportation mode differing from the transportation mode;

allocate the second carrier transportation resource to transport the item from the delivery location to the further location; and notify another interface at the allocated second transportation resource about the assignment.

2. The computer system of claim 1, wherein instructions configured to assign a first carrier transportation resource comprise instructions configured to assign a trucker to transport the item.

3. The computer system of claim 2, wherein instructions configured to assign a trucker to transport the one or more items comprise instructions configured to assign a trucker to transport a container.

4. The computer system of claim 2, wherein instructions configured to assign a trucker to transport the one or more items comprise instructions configured to assign a trucker to transport one or more pallets.

5. The computer system of claim 2, wherein instructions configured to notify an interface at the allocated trucking carrier transportation resource comprise instructions configured to send an electronic message to a trucker application indicating a pickup timeslot.

6. The computer system of claim 2, wherein instructions configured to notify an interface at the allocated first carrier transportation resource comprise instructions configured to send an electronic message containing shipment information to a trucker application associated with the trucker, the shipment information indicating a pickup type, a shipment identification, a shipment type, the pickup location, the delivery location, a date, a time, and customer information.

7. The computer system of claim 6, further comprising instructions configured to:

receive updated shipment information; and send an electronic message containing the updated shipment information to the trucker.

8. The computer system of claim 2, further comprising instructions configured to:

access a container identifier or pallet identifier from a trucker application;

associate the container identifier or pallet identifier with the shipment;

access a trucker location of the trucker from a location system;

compute a distance between the trucker location and the pickup location;

determine that that trucker is in the vicinity of the pickup location based on the computed distance; and update shipment status of the shipment to reflect the trucker has picked up the one or more items based on receiving the container identifier or pallet identifier and determining that the trucker is in the vicinity of the pickup location.

9. The computer system of claim 8, wherein instructions configured to access a container identifier or pallet identifier from the trucker application comprises instructions configured to:

receive an image from the trucker application; and perform Optical Character Recognition (OCR) on the image identifying the container identifier or pallet identifier.

10. The computer system of claim 8, wherein instructions configured to update shipment status of the shipment comprise instructions configured to indicate the location of the trucker on a customer real-time map along with an estimated time of arrival (ETA) at the delivery location.

11. The computer system of claim 8, further comprising instructions configured to provide directions from the pickup location to the delivery location to the trucker application.

12. The computer system of claim 2, wherein instructions configured to assign a second carrier transportation resource comprise instructions configured to assign one of: a sea carrier transportation resource, an air carrier transportation resource, or a train carrier transportation resource.

* * * * *